United States Patent [19]

Rice et al.

[11] Patent Number: 5,616,070
[45] Date of Patent: Apr. 1, 1997

[54] WORK DRIVE ORIENTING SYSTEM FOR MACHINE TOOL

[75] Inventors: Dennis F. Rice, Chambersburg; Ricky L. Mowen, Greencastle; Marshall W. Faith, Waynesboro, all of Pa.

[73] Assignee: Western Atlas Incorporated, Paramus, N.J.

[21] Appl. No.: 507,083

[22] Filed: Jul. 26, 1995

[51] Int. Cl.$^6$ ........................................... B24B 1/00
[52] U.S. Cl. ........................ 451/62; 451/9; 451/251; 451/307; 451/385; 451/399
[58] Field of Search .................... 451/8, 9, 307, 451/385, 460, 399, 398, 62, 249, 251

[56] References Cited

U.S. PATENT DOCUMENTS

| | | | |
|---|---|---|---|
| 3,041,792 | 7/1962 | Fleur | 451/399 |
| 3,863,402 | 2/1975 | Price | |
| 4,207,710 | 6/1980 | Fournier | |
| 4,373,301 | 2/1983 | Parnum et al. | |
| 4,934,882 | 6/1990 | Phillips | 451/399 |

*Primary Examiner*—Robert A. Rose
*Assistant Examiner*—George Nguyen
*Attorney, Agent, or Firm*—Hoffman, Wasson & Gitler

[57] ABSTRACT

A work drive orienting system for a machine tool, such as a multiple belt grinder, comprises a head stock and a tail stock for supporting the workpiece to be machined, a locator retained by a spider in the head stock chuck, and a proximity sensor located in the loader operatively associated with the machine tool. The workpiece has journals at opposite ends, and spaced eccentric portions, such as cam lobes; also, a locating pin projects axially from one end of the workpiece. The locating pin has a predetermined angular relationship to the spaced eccentric portions of the workpiece.

The locating pin must pass alongside the locator, which has a cylindrical body with a projecting tab, before power is supplied to the head stock and/or tail stock to drive same. A proximity sensor, located in the loader, scans an approximately 70° arc on the workpiece, for the presence of eccentric surfaces, such as cam lobes. If no lobes are detected, the pin will be in a position to pass safely alongside the locator, and the chuck for the workpiece may be engaged. If lobes are detected, the work drive spindle must be angularly rotated relative to the workpiece, before the machine tool can accept the workpiece with the projecting pin, and the chuck can be engaged to clamp the workpiece in the desired angular orientation. The tab on the locator contacts the projecting pin, to establish angular orientation to the workpiece relative to the headstock spindle and chuck, before power is supplied to said machine tool.

14 Claims, 5 Drawing Sheets

WORK DRIVE ORIENTING SYSTEM FOR MACHINE TOOL

FIELD OF THE INVENTION

The instant invention relates generally to work drive orienting systems for a machine tool, and more particularly to systems for angularly orienting a chucking mechanism so that a locating pin on one end of the workpiece passes by a locator retained within the chucking mechanism for the machine tool.

BACKGROUND OF THE INVENTION

Diverse devices have been employed for positioning a workpiece in a predetermined angular position with respect to a rotatable head stock and/or tail stock, prior to locking the opposite ends of the workpiece within the head stock and tail stock. When grinding a cam shaft, it is necessary to establish the workpiece in a fixed angular position with respect to locating means on the cam shaft, and to maintain such angular relationship, so that the lobes on the finished product are in proper angular relation with one another.

U.S. Pat. No. 3,667,167, granted to Happel, discloses a device for maintaining a workpiece in a fixed angular relation with respect to a master cam shaft so that the lobes on the finished product are in proper angular relation with one another. The master cam and drive spindle rotate in synchronism. The device includes a pair of opposing lock surfaces which engage a key that extends from a slot in the workpiece. Both of the lock surfaces are pivotably mounted to a backing plate, and springs actuate the plate to engage the key.

U.S. Pat. No. 2,984,955, granted May 1961, to Price, discloses another device for positively locating a workpiece with respect to a rotatable drive spindle. In this device, the drive spindle extends outward from a drive plate to engage a conical recess located in the end of a longitudinally extending workpiece. The workpiece is rotated about its axis by the drive spindle, and a pin is mounted in the drive plate at a location radially spaced from the spindle. The pin may be moved axially to engage a second recess in the workpiece in order to locate the workpiece in a predetermined angular relation with respect to the spindle and drive plate.

U.S. Pat. No. 4,207,710, granted Jun. 17, 1980, to Roger H. Fournier, discloses a workpiece positioning system (12) which holds a workpiece (14) in a predetermined angular position relative to a rotating drive spindle (20) of a machine, such as a cam shaft grinder or a pinion gear grinder. The workpiece is provided with a keyway (40) and a key (42; as shown in FIG. 2). The apparatus includes a drive element (sleeve 80) having a drive surface (73) which is rotated into engagement with one side of the key on the workpiece. Further rotation of the drive element rotates the workpiece and brings the opposite side of the key into engagement with an index surface (74—FIG. 5) on the positioning apparatus. Holding the key against the index surface maintains the workpiece in a predetermined angular relationship with the drive spindle during a grinding operation. The workpiece positioning apparatus includes a fluid actuated motor (75; see FIGS. 6 and 7), which rotates with the spindle and is operable to rotate the drive element.

A more sophisticated workpiece orienting system is disclosed in U.S. Pat. No. 3,863,402, granted Feb. 4, 1975, to Ralph E. Price. A loader is incorporated into such system, which is thus better suited for high speed processing of workpieces, for such system does not rely upon keys and slots, pins and recesses, etc. and other complementary mechanical alignment devices to properly orient the workpiece relative to the drive spindle.

Price discloses a workpiece orienting device, such as station 20, comprising a chute 10 for supporting a randomly oriented workpiece W, having an eccentric portion (cam lobe 40) to be ground to size. The workpiece is engaged by, and supported by, work centers 26, 28, which are axially advanced into engagement with the workpiece by hydraulic cylinders 36, 38. Hydraulic motor 32 slowly drives the workpiece W. An orienting finger 42 is selectively located to be radially aligned with the eccentric portion of the supported workpiece. The orienting finger is normally retained in a retracted position, as shown in solid outline in FIG. 3, but is advanced into engagement with the cam lobe 40 after a predetermined interval controlled by operating lever 48, limit switch 50, etc. The bearing surface 44 of finger 42 contacts the periphery of the cam lobe with sufficient force to prevent further rotation of the workpiece, as noted in column 2, lines 35–41. The workpiece is thus arrested at a predetermined angular position, prior to grinding, under the control of a master cam—note column 2, lines 17–23.

The foregoing patents disclose complex systems that angularly orient workpieces, in a machine tool, in a particular manner, before clamping same in a fixed position, and then initiating machining operations. The systems rely upon two speed motors, in some instances, and cooperating mechanisms, to sense the eccentric surfaces on a workpiece rotated at slow speeds. Then, after clamping the workpiece in fixed position between the spindles of the head stock and tail stock, machining operations take place under the control of the second, high speed motor.

Such systems function satisfactorily, when the workpiece has similar cylindrical ends. However, such systems are seemingly incapable of orienting workpieces which are characterized by an axially projecting pin at one end thereof.

Furthermore, the speed of operation of known orienting systems is inadequate to meet the demands of current high speed production lines, and such limitations have created a demand for a simple, effective, and rapid system for orienting a chucking mechanism, with a locator retained therein, relative to a workpiece with a protruding pin. The present invention seeks to overcome the shortcomings of known workpiece orienting systems, by focusing upon angularly orienting a locator in the chucking mechanism relative to the pin on the workpiece. The present invention relies upon a proximity sensor in an otherwise conventional loader, to "read" the eccentric surfaces on the workpiece, and adjust the position of the chuck in reliance upon such "reading".

SUMMARY OF THE INVENTION

The instant work drive orienting system accepts workpieces with axially projecting pins, such as locating pins, at one end thereof; such locating pins are an integral part of automotive timing systems. The locating pins vary in length in accordance with the requirements of the customer, usually an automobile manufacturer. The instant system relies upon a locator, of sufficient thickness to accept the variations in pin length, without adjusting the system after each machining run.

The locator is formed of a hardened steel, and assumes the form of a cylindrical body with a projecting tab. A spider retains the locator in fixed position within the head stock of the machine tool. When the locating pin passes alongside the locator, power is supplied to the head stock and/or to the cooperating tail stock, to rotate the locator into abutting engagement with the locating pin, and thereby locate the workpiece in angular relation to the driving chuck.

The instant work drive orienting system is compatible with conventional workpiece loaders, and can accept workpieces in any angular orientation. An orienting mechanism is thus not required within the loader, lowering the cost of the loader without impairing its operation.

A sensor has been incorporated into the loader, and the sensor detects the presence, or absence, of eccentric surfaces, such as cam lobes, on the workpiece. Since a predetermined angular relationship exists between the cam lobes and the locating pin, "reading" the cam lobes with the sensor provides information to the machine control regarding the location of the locating pin.

If the locating pin orientation is such that the pin will clear the projecting tab on the locator, the work drive spindle and chuck remain stationary while the workpiece is loaded into the machine tool by the workpiece loader and is pushed laterally into the chuck by the tail stock. Work drive spindle rotation begins while the workpiece remains stationary until the projecting tab on the locator contacts the locating pin on the workpiece. Chucking then takes place, to maintain the angular relationship of the work drive spindle to the workpiece during machining.

If the locating pin orientation is such that the pin will not clear the projecting tab on the locator, the work drive spindle and chuck rotate to a programmable position, while the workpiece is loaded into the machine tool by the workpiece loader. The tail stock then pushes the workpiece laterally into the chuck. Then rotation of the work drive spindle begins, while the workpiece remains stationary until the projecting tab on the locator contacts the locating pin on the workpiece. Chucking then takes place to maintain the angular relationship of the work drive.

The preferred form of the sensor is a proximity switch, which has a "field of vision" of approximately 70°. However, other forms of sensors might be equally effective in "reading" the presence, or absence, of eccentric surfaces at the selected position on the workpiece.

Furthermore, the method of using the instant work drive orienting system is simple, yet effective, and insures high-speed production of finished workpieces, with the angular orientation presently required by the consumer. The method includes the steps of (1) "reading" the eccentric surfaces, such as cam lobes, on the workpiece by a proximity sensor, (2) determining from such reading if the locator in the chuck on the head stock will allow the projecting pin on the workpiece to pass freely thereby, (3) introducing a workpiece, with an axially projecting pin, onto work cradles, (4) rotating the locator so that the locator contacts the pin, (5) closing the chuck to maintain the contacting relationship between the locator and the pin, (6) closing the jaws of the work rest body to support the workpiece, and (7) supplying power to the head stock to rotate same and thereby drive the workpiece through machining operations. Such method finds particular application in machining workpieces, such as cam shafts, with an axially projecting pin, such as a locating pin, at one end thereof. The pin presents unusually difficult problems in processing same.

Yet other advantages realized by the instant work drive orienting system will occur to the skilled artisan when the ensuing specification and appended drawings are construed in harmony.

DESCRIPTION OF THE PREFERRED EMBODIMENT

Figure 1:
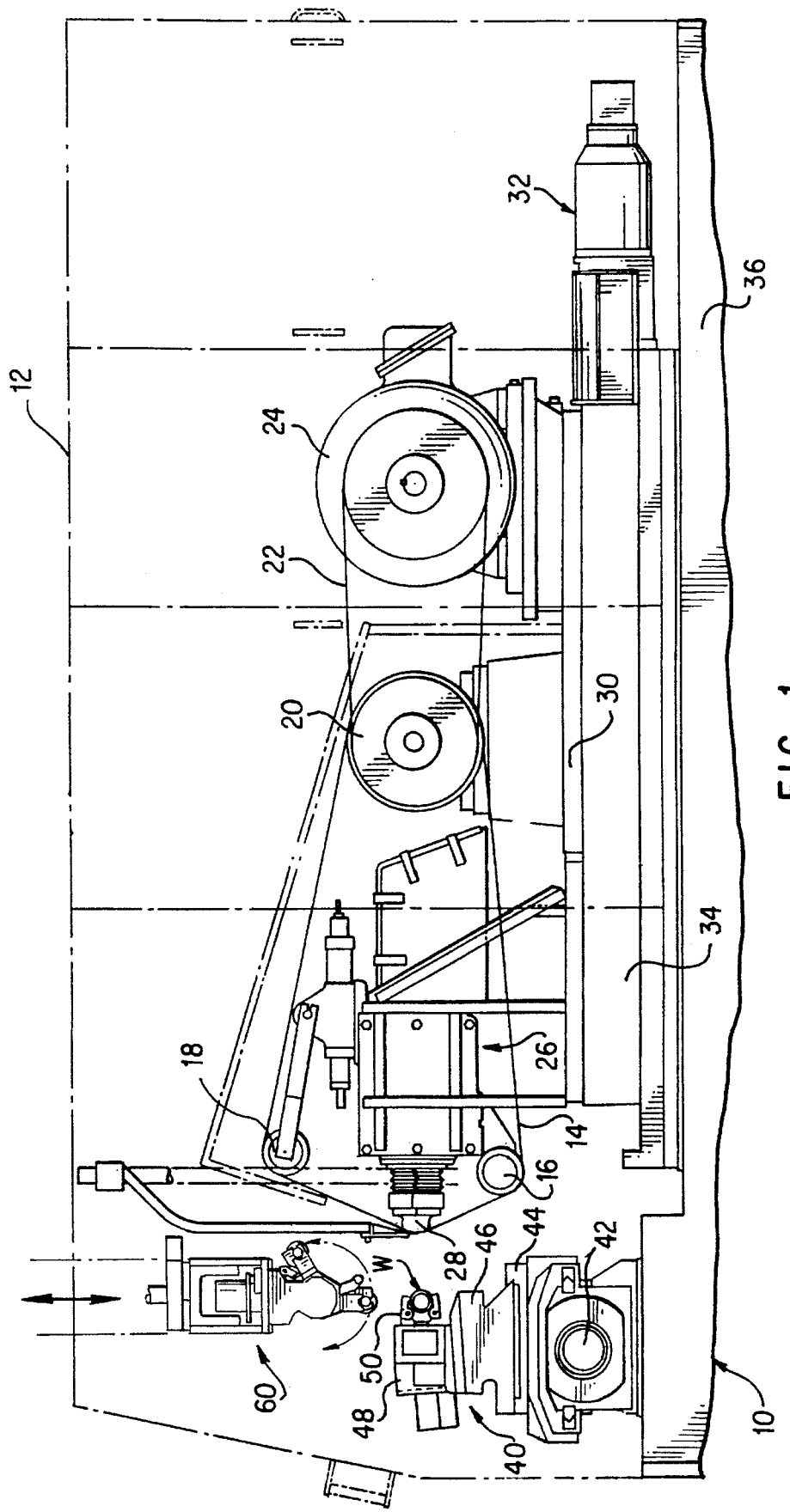
FIG. 1 is a side elevational view of a multiple belt grinding machine with an overhead loader for introducing workpieces to the grinding machine.

FIG. 1 depicts the key components of a multiple belt grinding machine 10, such as shown in U.S. Pat. No. 5,371,973, granted Dec. 13, 1994, and assigned to Western Atlas Inc., the assignee of the instant application. Machine 10 is housed within an enclosure 12, indicated by the dotted outline.

Machine 10 includes an endless abrasive belt 14, that is trained about pulleys 16, 18 and drive drum assembly 20. Drive belt 22 transmits power to drive drum assembly from motor 24. A contouring head assembly 26, including a back-up shoe 28, presses against the rear face of abrasive belt 14. Positioning slide 30 is moved by slide feed assembly 32 relative to base 34, which is retained on base 36. The movement advances the contouring head assembly relative to workpiece W.

A carriage traverse assembly, indicated generally by reference numeral 40, is situated at the front of machine 10, to receive, and retain, workpiece W. The traverse assembly moves perpendicular to the movement of contouring head assembly 26. Traverse assembly 40 includes motor 42, which drives carriage 44; swivel table 46 is mounted atop carriage 44. Work rest body 48 is secured to swivel table 46, and jaws 50 project from body 48 toward the contouring head assembly. Work pieces W are discharged from the overhead loader 60 onto work cradles. Jaws 50 engage journals formed on each workpiece W. Work rest body 48, and jaws 50, support workpiece W during angular location, chucking, and during grinding operations.

Loader 60, which is suspended from an overhead mounting arm (not shown), is lowered through an opening in enclosure 12 into operative relationship to traverse assembly 40, prior to discharging a work piece W to be machined. After work piece W has been ground to the desired contour, the finished workpiece is retrieved from traverse assembly 40, and discharged onto a conveyor (not shown). The extent of vertical travel of loader 60 is indicated by the directional arrow in FIG. 1.

Figure 2:
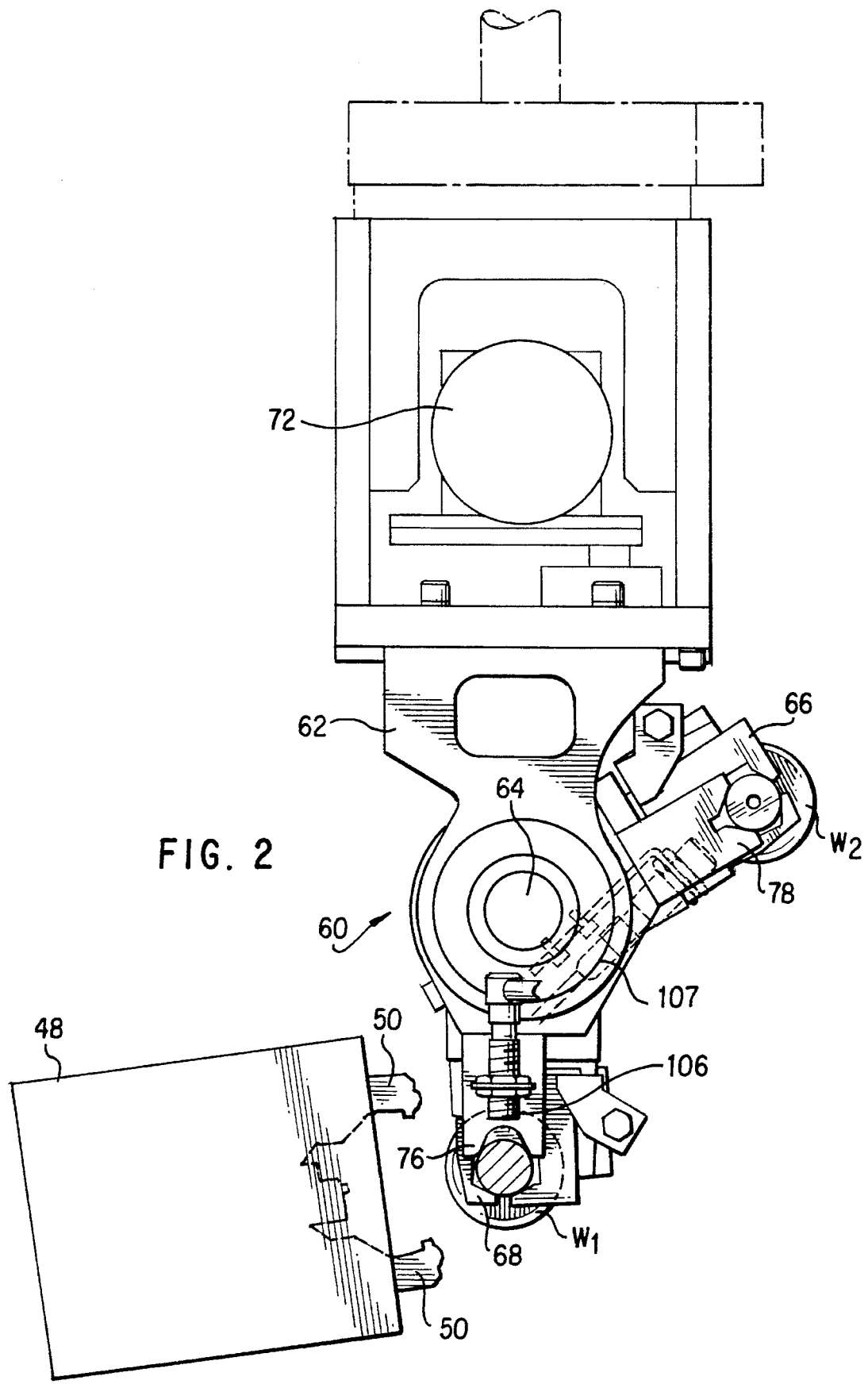
FIG. 2 is a side elevational view, on an enlarged scale, of the overhead loader and workpiece holder of the grinding machine of FIG. 1, with a sensor located within the loader.

As shown in FIG. 2, loader 60 includes a depending casing 62 with a shaft 64 passing therethrough. Grippers 66, 68, are mounted on shaft 64, and are indexed relative thereto. Each gripper includes jaws that engage a work piece W, and retain same in fixed position. Gripper 66 delivers a work piece W, to be machined, onto work cradles situated between tail stock 49 and cooperating head stock chuck 70 (shown in FIG. 3). Actuator 72 delivers power to rotate shaft 64 via drive belt 74. Vee blocks 76, 78 on loader 60 press downwardly upon workpieces $W_1$ and $W_2$ with sufficient frictional force to retain the workpiece stationary. Vee blocks 76, 78 and grippers 66, 68 support workpieces during loading and unloading. Gripper 66 is only used for rough, or unground workpieces $W_2$, while gripper 68 is only used for finished, or ground, workpieces $W_1$.

Figure 3:
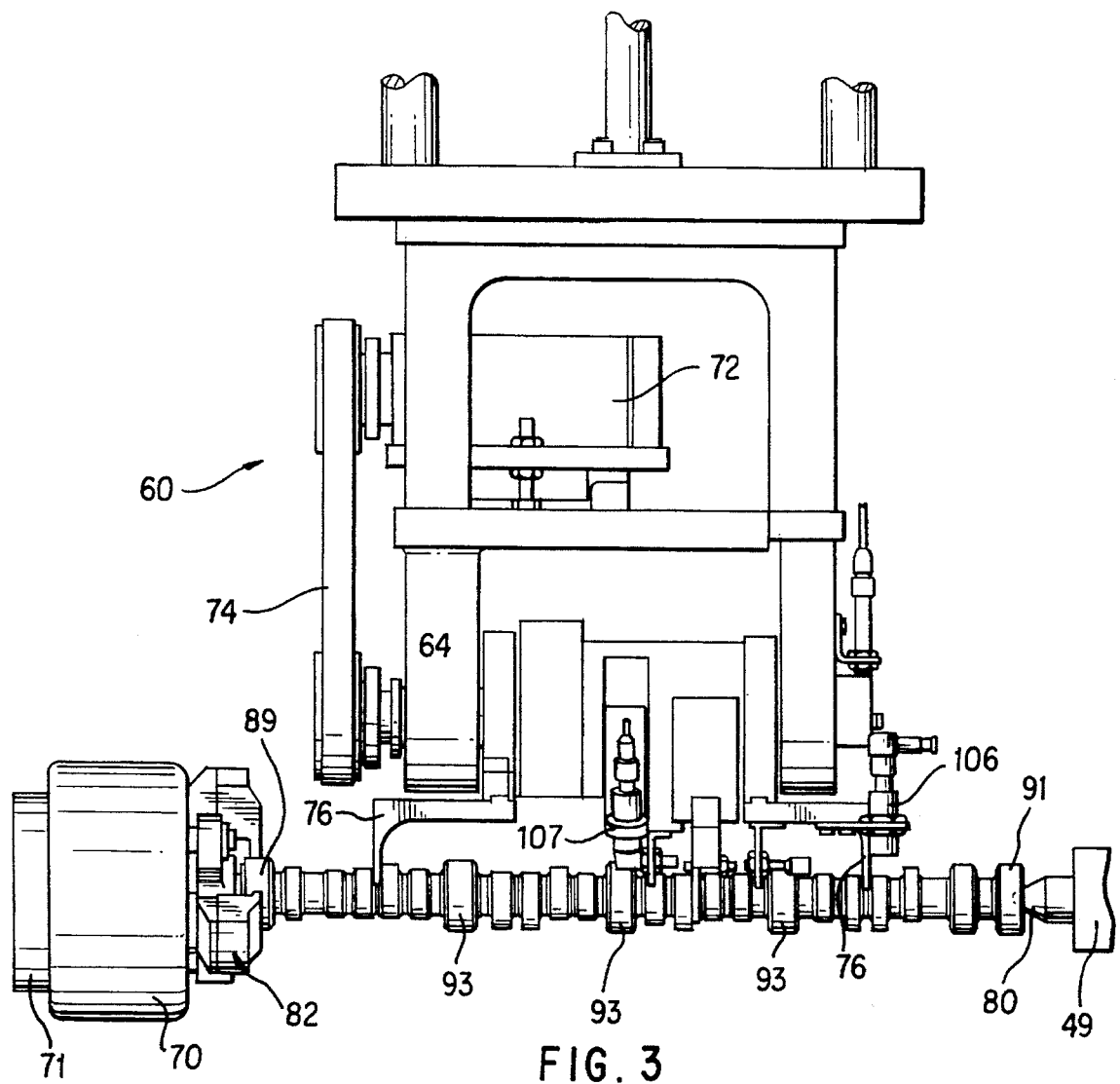
FIG. 3 is a front elevational view of the overhead loader and workpiece holder of FIG. 2, with a workpiece retained between the head stock and tail stock of the workpiece holder.

The workpiece, designated as $W_2$, is deposited onto work cradles (not shown) located between head stock 71 and tail stock 49; only the work center 80 of tail stock 49 is visible in FIG. 3. Jaws 50 exert sufficient frictional force to retain workpiece $W_2$ in fixed position.

Figure 4:
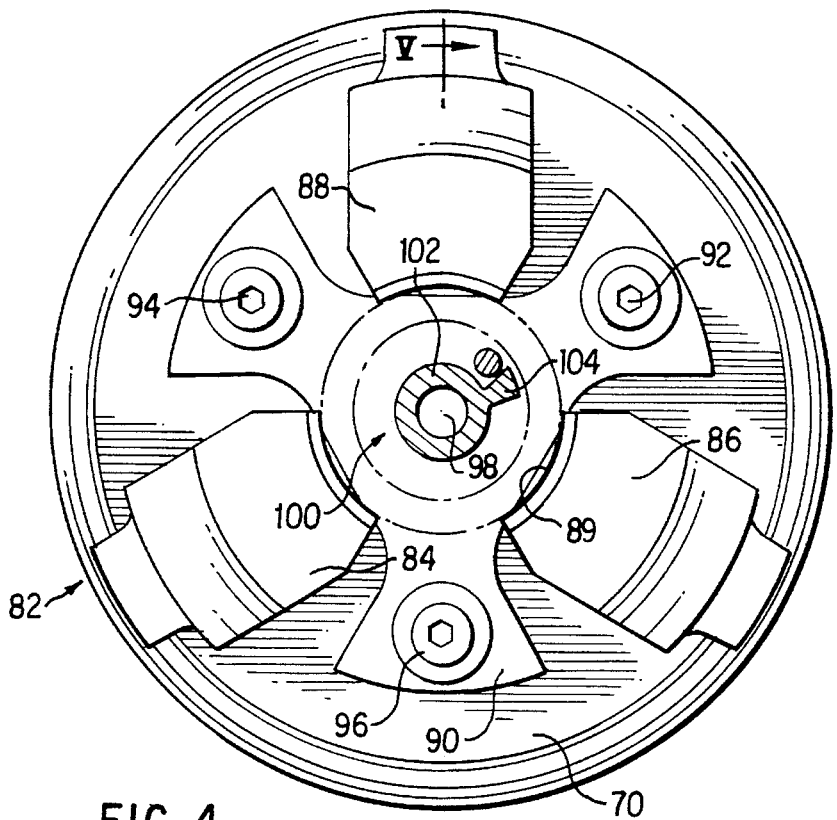
FIG. 4 is an end view of the locator secured within the chuck of the grinding machine, such view being taken along line IV—IV in FIG. 5.

Chuck 70 is situated at the inner face of head stock 71; only a fragment of head stock 71 is visible in FIG. 3. As shown in FIG. 4, chuck 70 includes three radially movable jaws 84, 86, 88. The jaws are movable radially inwardly so that the curved interior surfaces of the jaws securely contact journal 89 after the workpiece is inserted therein. At least one other journal 91 is located at the remote end of the workpiece, and additional journals may be formed along the axial length of the workpiece. The additional, intermediate journals 93 may be engaged by gripping jaws 50 on work rest body 48. As work center 80 pushes the workpiece laterally into chuck 70, gripping jaws 50 remain open, so that the jaws do not scratch or otherwise mar the finish on the workpiece. Jaws 84, 86, 88 are energized by an electrical circuit (not shown) in a conventional manner, after tab 104 on locator 100 is rotated into contact with pin P on workpiece W.

A spider 90 is retained in a laterally substantially fixed position, relative to chuck 70, by bolts 92, 94, and 96. Boss 98 is formed on spider 90, and a locator 100 is secured onto the boss.

Figure 5:
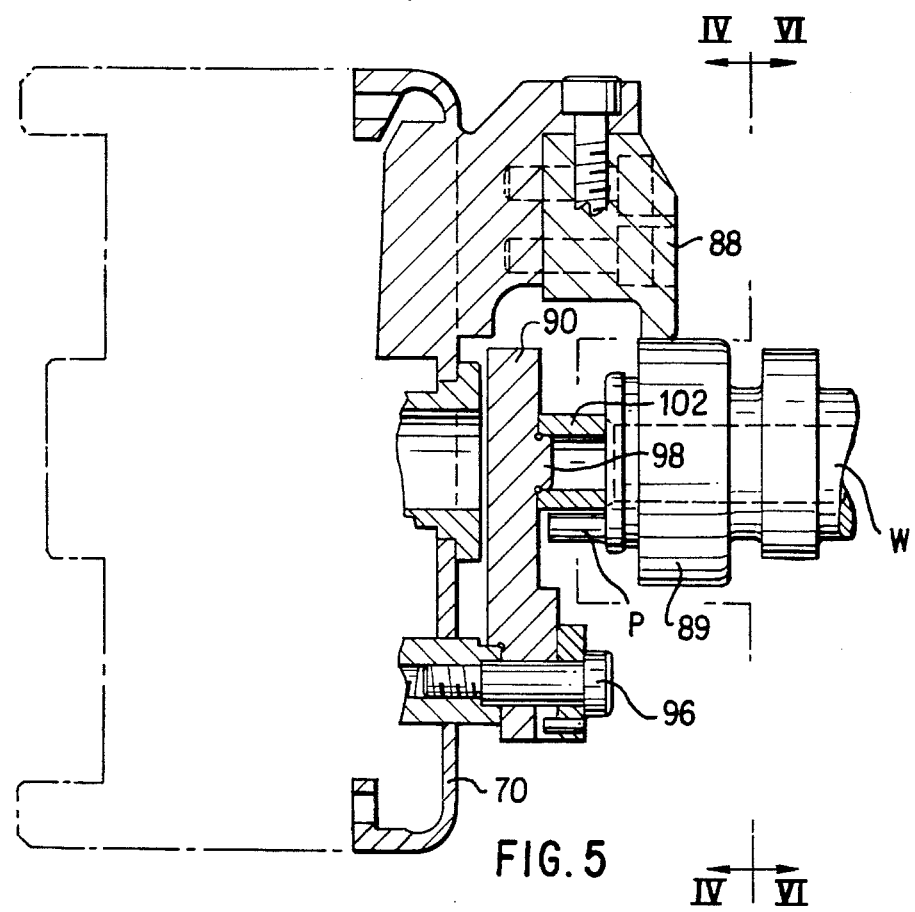
FIG. 5 is a vertical cross-sectional view of the locator and chuck, such view being taken along line V—V in FIG. 4 and in the direction indicated.

Locator 100, as shown in FIGS. 4 and 5, comprises a hollow cylindrical body 102 and a radially projecting tab 104. Locator 100 is executed in a durable, impact resistant, carbide steel.

Workpiece W includes an axially projecting pin P that must be in proper angular orientation relative to locator 100 with projecting tab 104 to permit workpiece loading into chuck 70. Such pin varies somewhat in length on various camshaft designs. Body 102 of locator 100 is fabricated with a thickness approaching one inch, so that pins of different axial length can pass thereby, as shown in FIG. 5. When pin P passes axially by tab 104, and head stock drive spindle is energized, locator 100 starts to rotate and tab 104 abuts pin P. The chuck jaws 84, 86, 88 then clamp the workpiece for machining.

Figure 6:
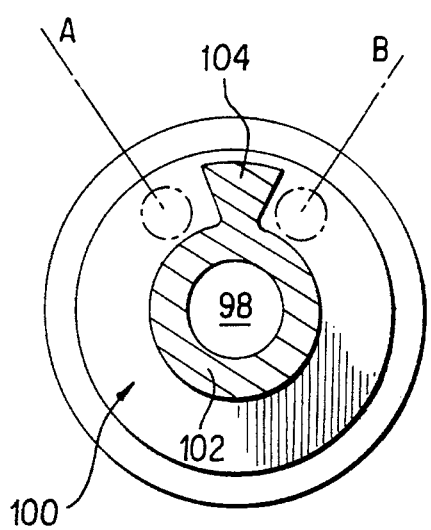
FIG. 6 is a vertical cross-sectional view of the locator and the drive pin of the workpiece, such view being taken along line VI—VI of FIG. 5 and in the direction indicated.

FIG. 6 schematically suggests that axially extending pin P can pass alongside tab 104 on locator 100 at any point along an arc of approximately 300°. Tab 104 is asymmetrical, as shown in FIG. 6. The extreme positions of pin location, relative to tab 104, are shown in dotted outline, and any location between the extreme positions is permissible. However, at any position along the arcuate line A-B, pin P will strike locator tab 104; since locator 100 is formed of hardened steel, such as carbide, or other high-strength metals, the locator is brittle and may fracture, or crack, in response to the axial forces imposed thereon by pin P. Also, if pin P does not fit into the recess defined by the axial thickness of locator 100, chuck 70 can not properly engage workpiece W and retain same in a proper angular orientation to insure accurate grinding of cam lobes on the work piece.

A predetermined angular relationship between pin P and the eccentric surfaces, or cam lobes, is established during the manufacture of each work piece W. Consequently, by detecting the presence of cam lobes, at a specific location along the axial dimension of work piece W, the approximate position of pin P is determined. A proximity sensor 106 mounted on loader 60 performs such function admirably.

Figure 7:
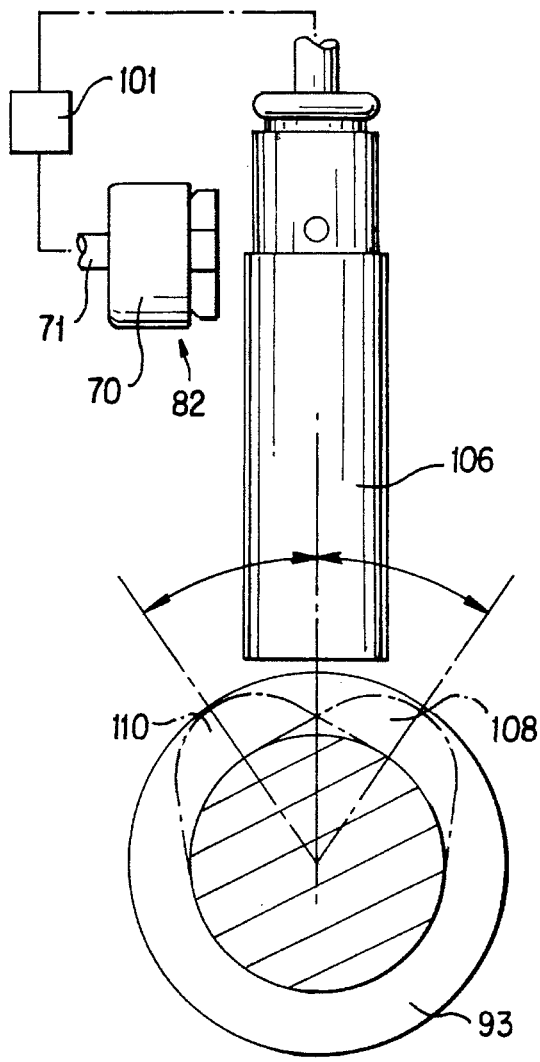
FIG. 7 is a side elevational view of the sensor of FIG. 2, the sensor being shown in operative relationship to the workpiece.
Figure 8:
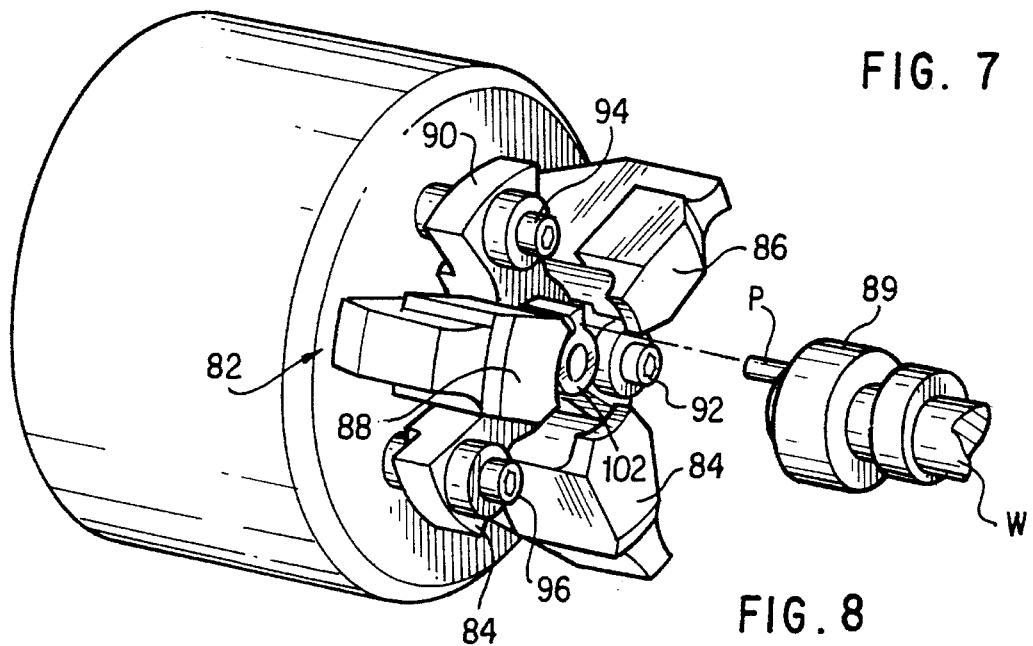
FIG. 8 is a perspective view of the driving pin on the workpiece, and the locator in the chuck which must be properly oriented relative to the drive pin.

As shown generally in FIG. 3, and with particularity in FIG. 7, proximity sensor 106 has a field of vision of approximately 70°. If the sensor "sees", or detects, a cam lobe, such as lobe 108 or lobe 110, in its field of vision, the sensor generates a signal indicating that the pin P on work piece W will not pass cleanly alongside locator 100 without striking same. Such signal is processed by controller 101, which may be a programmable computer of conventional design, and which produces a resultant signal. Such resultant signal will cause the spindle of head stock 71 to rotate to a programmable position prior to the "rough" grippers 66, 68 on loader 60 releasing the workpiece to work cradles situated between work center 80 of tail stock 49 and chuck 70 of the head stock. Chuck 70 is energized, and power is supplied to spindle of head stock 71, so that the workpiece is rapidly brought up to speed. Contouring head assembly 26 is then advanced so that the multiple abrasive belts 14 on grinding machine 10 contact the several cam lobes spaced along workpiece W, and simultaneously grind same to the desired shape.

Proximity sensor 106 works in concert with sensor 107, which detects if a workpiece W is present in the loader.

Numerous other refinements and modifications may be suggested by the foregoing description of a preferred embodiment of the invention. For example, limit switches may be substituted for proximity sensor 106. Different work rests may be utilized on the loader, and on traverse assembly 40, and the relationship therebetween may be altered. Also, sensor 106 may be used to indicate the absence of a cam lobe, when an inverter circuit is associated therewith, with equal facility. While the preferred embodiment of the invention sets forth a multiple belt grinding machine as an exemplary machine tool, the same invention would find application in a single belt grinder, a grinder utilizing a grinding wheel, and numerous other machine tools. Consequently, the appended claims should be broadly construed in a manner consistent with the significant advances in the useful arts and sciences achieved by the present invention.

I claim:

1. A system for angularly orienting a work drive within a machine tool to accept a workpiece,
    a) said workpiece comprising at least a shaft, eccentric surfaces on said shaft, and a pin projecting axially from one end of said shaft,
    b) said machine tool including a traverse carriage with a head stock, a drive spindle for said head stock, and a tail stock, said head stock and said tail stock being mounted for relative movement along said traverse carriage,
    c) said machine tool further including abrasive means to contact said eccentric surfaces on said workpiece and machine same, and a loader to deliver workpieces to said machine tool, d) a chuck for clamping said workpiece securely to said head stock, e) locator means retained within said chuck, f) sensing means in said loader for detecting eccentric surfaces on said workpiece at predetermined angular relationships relative to said pin, g) control means responsive to said sensing means for adjusting said chuck so that said locator means clears said axial pin on said workpiece as said workpiece enters said chuck, h) said locator means contacting said axial pin to angularly orient said workpiece relative to said head stock before said chuck clamps said workpiece, and i) means for supplying power to said chuck to close said chuck about said workpiece and to drive said drive spindle to rotate the workpiece relative to said abrasive means.

2. The system of claim 1 wherein said sensor means is a proximity sensor.

3. The system of claim 2 wherein said proximity sensor has approximately a 70° field of vision, said eccentric surfaces are cam lobes, and said workpiece is a camshaft.

4. The system of claim 1 wherein said control means is a programmable computer.

5. The system of claim 1 wherein a spider securely retains said locator means within said chuck.

6. The system of claim 1 wherein said locator means comprises a cylindrical body with a radially extending tab.

7. The system of claim 6 wherein said tab is asymmetrical in shape, and said tab possesses an axial thickness that is greater than the axial projection of said pin.

8. The system of claim 5 wherein a boss is formed on said spider, said locator means comprises a cylindrical body with a radially extending tab, and said cylindrical body is engaged with said boss so that said locator means is secured to said spider.

9. A system for angularly orienting a work drive within a machine tool to accept a workpiece, a) said workpiece comprising at least a shaft, eccentric surfaces on said shaft, and a pin projecting axially from one end of said shaft, b) said machine tool including a traverse carriage with a head stock, a drive spindle for said head stock, a tail stock, said head stock and said tail stock engaging opposite axial ends of said workpiece and being mounted for relative movement along said traverse carriage, c) said machine tool further including abrasive means to contact said eccentric surfaces on said workpiece and machine same, d) a chuck for clamping said workpiece securely to said head stock, e) means for supplying power to said chuck to close same about said workpiece, and to said head stock to rotate said spindle, f) said spindle rotating said workpiece relative to said abrasive means, g) the invention being characterized by:

1) locator means retained within said chuck, 2) sensing means for detecting eccentric surfaces on said workpiece at predetermined angular relationships relative to said pin, 3) control means responsive to said sensing means for adjusting said chuck so that said locator means clears said axial pin on said workpiece as said workpiece is advanced into said chuck by movement of said tail stock, and 4) said locator pin contacting said axial pin to angularly orient said workpiece relative to said head stock before said chuck clamps said head stock to the workpiece.

10. A method of angularly orienting a work drive within a machine tool to accept a workpiece, said workpiece comprising at least a shaft, eccentric surfaces defined on said shaft, and a pin projecting axially from one end of said shaft, said machine tool including a traverse carriage, a head stock, a spindle for said head stock, a tail stock, said head stock and said tail stock mounted for relative movement along said traverse carriage, said machine tool further including a chuck located at the entrance to said head stock, locator means retained within said chuck, a tool for machining said workpiece, and work holder means located between said head stock and said tails stock, said method of angularly orienting said work drive to accept said workpiece comprising the steps of:

a) sensing the location of the eccentric, surfaces on said workpiece to generate a signal representative of the predetermined location of said axial pin relative to said eccentric surfaces, b) feeding said signal to said control means for angularly adjusting said chuck so that said axial pin clears said locator means, c) introducing said workpiece into said machine tool, d) advancing said tail stock so that the protruding axial pin on one end of the workpiece is driven into said chuck without contacting said locator means, e) advancing said work holder means so that said work holder means frictionally engages said workpiece, f) rotating said chuck so that said locator means contacts said axial pin and establishes a fixed relationship between said chuck and said workpiece, g) closing said chuck about said workpiece, and h) delivering power to said spindle so that said workpiece is rotated relative to said tool for machining same.

11. The method of claim 10 wherein said sensing operation is achieved by a non-contact sensor spaced from said eccentric surfaces.

12. In method of claim 11 wherein said non-contact sensor is located within a loader for delivering workpieces to said machine tool.

13. The method of claim 11 wherein the sensing operation is performed by a proximity switch, said switch generating a signal in response to the presence of eccentric surfaces on said workpiece.

14. The method of claim 11 wherein the sensing operation is performed by a proximity switch, said switch generating a signal in response to the absence of eccentric surfaces on said workpiece.

* * * * *